US00RE50108E

(19) United States
(12) Reissued Patent
Haberman

(10) Patent Number: US RE50,108 E
(45) Date of Reissued Patent: Sep. 3, 2024

(54) MOBILE FUELING SYSTEM AND METHOD

(71) Applicant: A3 Labs LLC, Oakland, CA (US)

(72) Inventor: David Haberman, Delay Beach, FL (US)

(73) Assignee: A3 LABS, LLC, Oakland, CA (US)

(21) Appl. No.: 16/945,386

(22) Filed: Jul. 31, 2020

Related U.S. Patent Documents

Reissue of:
(64) Patent No.: 10,035,418
Issued: Jul. 31, 2018
Appl. No.: 15/700,821
Filed: Sep. 11, 2017

U.S. Applications:
(62) Division of application No. 15/451,264, filed on Mar. 6, 2017, now Pat. No. 9,758,033.

(51) Int. Cl.

| | |
|---|---|
| ***B60K 15/04*** | (2006.01) |
| ***B60K 15/03*** | (2006.01) |
| ***B60K 15/05*** | (2006.01) |
| ***B67D 7/42*** | (2010.01) |
| ***B67D 7/58*** | (2010.01) |

(52) U.S. Cl.
CPC ..... *B60K 15/04* (2013.01); *B60K 15/03006* (2013.01); *B60K 15/05* (2013.01); *B67D 7/42* (2013.01); *B67D 7/58* (2013.01); *B60K 2015/03019* (2013.01); *B60K 2015/03315* (2013.01); *B60K 2015/0458* (2013.01)

(58) Field of Classification Search
CPC ..... B60K 15/04; B60K 15/0406; B60K 2015/0458; B60K 2015/0321; B67D 7/42; B67D 7/58; F24F 3/163; F24F 3/167; F24F 2011/0004; F24F 2011/0005
USPC ..... 414/217.1, 411, 940
See application file for complete search history.

(56) References Cited

U.S. PATENT DOCUMENTS

| | | | | |
|---|---|---|---|---|
| 5,301,723 | A * | 4/1994 | Goode | F17C 5/02 141/11 |
| 5,701,928 | A | 12/1997 | Aoki | |
| 6,082,392 | A | 7/2000 | Watkins, Jr. | |
| 6,202,710 | B1 | 3/2001 | Dill et al. | |
| 7,699,127 | B2 | 4/2010 | Horii et al. | |
| 8,236,436 | B2 | 8/2012 | Minamiura | |
| 8,459,313 | B2 | 6/2013 | Iida et al. | |

(Continued)

*Primary Examiner* — William E Dondero
(74) *Attorney, Agent, or Firm* — BRYAN CAVE LEIGHTON PAISNER LLP

(57) ABSTRACT

Some embodiments include a mobile fueling system. The mobile fueling system includes a fueling lid configured to cover a fueling compartment opening, and a recessed fueling compartment having the fueling compartment opening. The recessed fueling compartment includes one or more compartment walls having at least one recessed wall portion that is recessed a predetermined distance away from the fueling compartment opening, with the one or more compartment walls defining an interior compartment volume. The recessed fueling compartment further includes a fueling port configured to couple the recessed fueling compartment to a fuel storage tank, and a gas inlet in at least one of the one or more compartment walls of the recessed fueling compartment. The gas inlet is configured to introduce a gas into the interior compartment volume. Other embodiments of related systems and methods are also disclosed.

18 Claims, 8 Drawing Sheets

(56) References Cited

U.S. PATENT DOCUMENTS

| | | | | |
|---|---|---|---|---|
| 8,948,947 | B2 | 2/2015 | Takaku et al. | |
| 2009/0044866 | A1 | 2/2009 | Pearson | |
| 2009/0308489 | A1 | 12/2009 | Hirakata | |
| 2010/0206427 | A1 | 8/2010 | Iida et al. | |
| 2014/0150422 | A1* | 6/2014 | Brown | F17C 5/007 60/599 |
| 2014/0248833 | A1* | 9/2014 | Royle | F24F 11/0001 454/342 |

* cited by examiner

MOBILE FUELING SYSTEM AND METHOD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a divisional of U.S. application Ser. No. 15/451,264, filed Mar. 6, 2017 and currently pending, the contents which are all incorporated herein by reference in their entirety for all purposes.

FIELD OF THE INVENTION

This disclosure relates generally to a mobile fueling system for fuel dispensing and/or fuel delivery to or from a fuel storage tank of a vehicle, and related methods.

DESCRIPTION OF THE BACKGROUND

Vehicles such as cars, motorcycles, trucks, planes, boats, and others, require a fuel supply that is replenished from time to time, such as when the fuel supply has become exhausted through use of the vehicle. Accordingly, such vehicles can include a fueling port that allows for a fuel to be transferred into or out of a storage tank in the vehicle, as needed. However, there remains a need for improved fueling port systems and/or apparatuses for such vehicles and other mobile devices that provide for transfer of a fuel into or out of the vehicle and/or mobile device, to allow for storage of the fuel therein.

BRIEF DESCRIPTION OF THE DRAWINGS

To facilitate further description of the embodiments, the following drawings are provided in which.

Figure 1A:
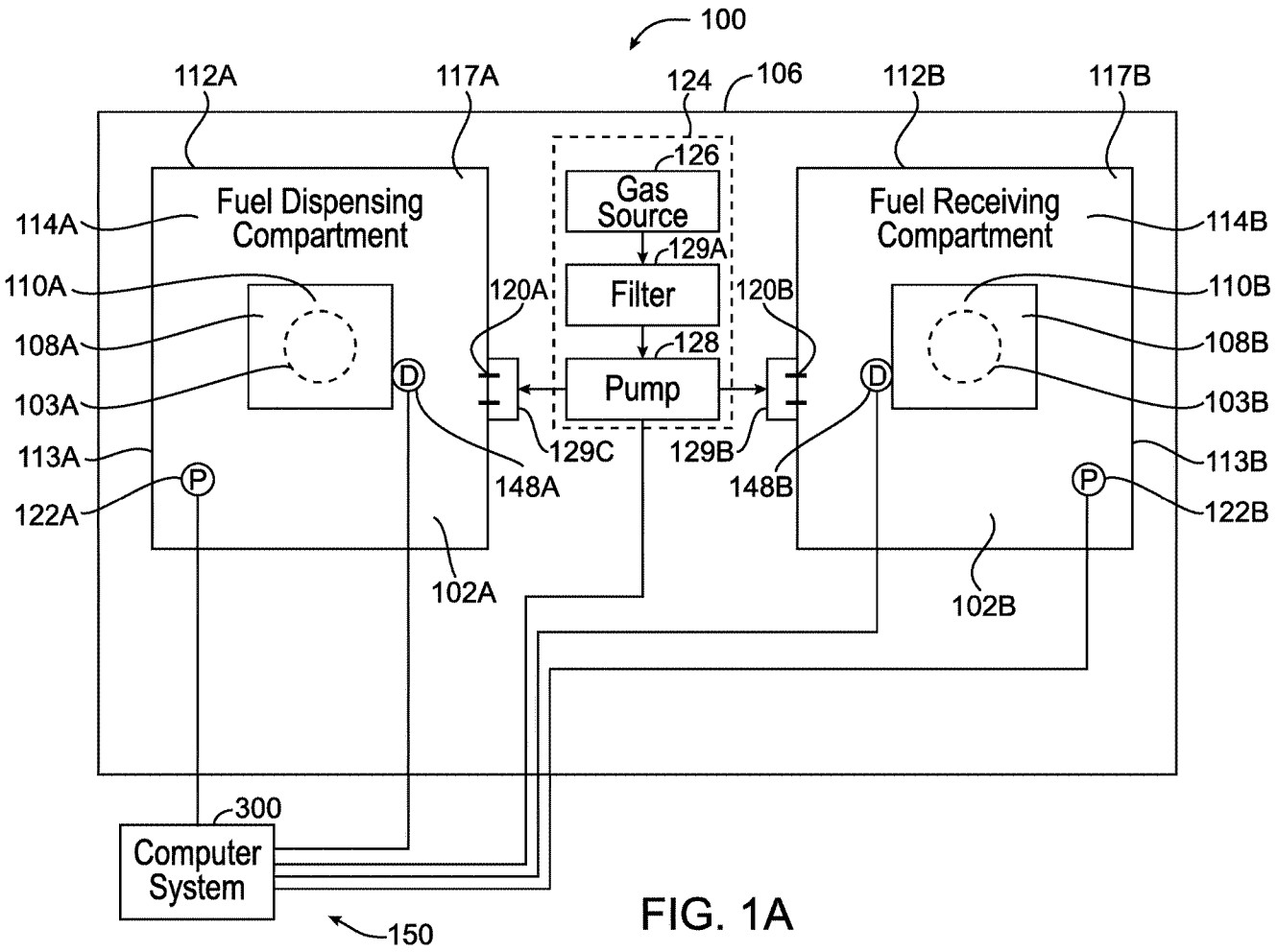
FIG. 1A illustrates a schematic view of a mobile fueling system according to one embodiment.

For simplicity and clarity of illustration, the drawing figures illustrate the general manner of construction, and descriptions and details of well-known features and techniques can be omitted to avoid unnecessarily obscuring the invention. Additionally, elements in the drawing figures are not necessarily drawn to scale. For example, the dimensions of some of the elements in the figures can be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but can include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically and/or otherwise. Two or more electrical elements can be electrically coupled together, but not be mechanically or otherwise coupled together; two or more mechanical elements can be mechanically coupled together, but not be electrically or otherwise coupled together; two or more electrical elements can be mechanically coupled together, but not be electrically or otherwise coupled together. Coupling can be for any length of time, e.g., permanent or semi-permanent or only for an instant.

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types.

The absence of the word "removably," "removable," and the like near the word "coupled," and the like does not mean that the coupling, etc. in question is or is not removable.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

The term "computer network" is defined as a collection of computers and devices interconnected by communications channels that facilitate communications among users and allows users to share resources (e.g., an internet connection, an Ethernet connection, etc.). The computers and devices can be interconnected according to any conventional network topology (e.g., bus, star, tree, linear, ring, mesh, etc.).

DETAILED DESCRIPTION OF EXAMPLES OF EMBODIMENTS

Some embodiments include a mobile fueling system. The mobile fueling system comprises a fueling lid configured to cover a fueling compartment opening, and a recessed fueling compartment comprising the fueling compartment opening and having one or more compartment walls comprising at least one recessed wall portion that is recessed a predetermined distance away from the fueling compartment opening, the one or more compartment walls defining an interior compartment volume, wherein the recessed fueling compartment further comprises a fueling port configured to couple the recessed fueling compartment to a fuel storage tank, and a gas inlet in at least one of the one or more compartment walls of the recessed fueling compartment, the gas inlet being configured to introduce a gas into the interior compartment volume.

Various embodiments further include a method comprising providing a flow rate of gas into a recessed compartment, detecting one or more of opening or closing of a lid for the recessed compartment, and changing the flow rate of the gas into the recessed compartment upon or after detecting the opening or closing of the lid, and before, during or after dispensing fuel from or delivering the fuel to a mobile fuel storage tank.

Various embodiments can also include a method comprising providing a fueling lid configured to cover a recessed fueling compartment opening, providing a recessed fueling compartment comprising the fueling compartment opening and having one or more compartment walls comprising at least one recessed wall portion that is recessed a predetermined distance away from the fueling compartment opening, the one or more compartment walls defining an interior compartment volume, wherein the recessed fueling compartment further comprises a fueling port configured to couple the recessed fueling compartment to a fuel storage tank, and a gas inlet in at least one of the one or more compartment walls of the recessed fueling compartment, the gas inlet being configured to introduce a gas into the interior compartment volume, and coupling the fueling lid to the recessed fueling compartment.

Figure 1B:
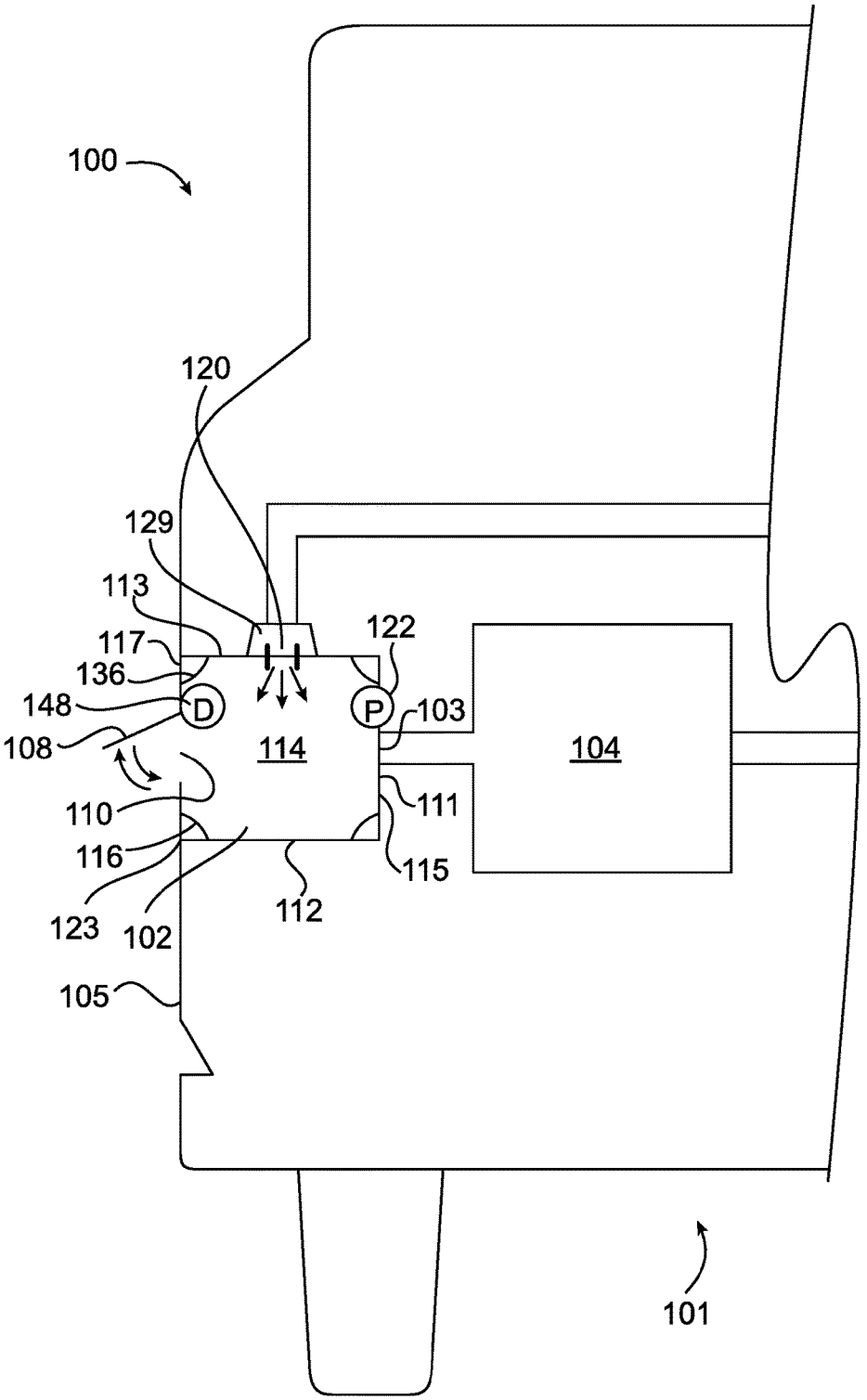
FIG. 1B illustrates a partial side, cross-sectional view of the mobile fueling system of FIG. 1A.

Referring to FIGS. 1A and 1B, an embodiment of a mobile fueling system 100 is shown that comprises a recessed fueling compartment 102 (102A, 102B in FIG. 1A) having a fueling port 103 (103A, 103B in FIG. 1A) disposed therein, for dispensing a fuel from and/or delivering a fuel to a fuel storage tank 104. Mobile fueling system 100 can be used to prevent or at least inhibit contamination of a fuel source used in mobile fueling system 100. In one embodiment, mobile fueling system 100 can be a part of a mobile system, such as for example by being incorporated into and/or carried by a vehicle 101 such as an automobile (e.g., cars, trucks, motorcycles), water-craft (e.g., boats, ski-jets) aircraft (e.g., passenger planes or drones), construction and/or labor vehicles (e.g., cranes, lawnmowers), public transportation vehicles, autonomously or remotely guided vehicles, and other mobile vehicles. For example, in one embodiment as shown in FIG. 1B, at least a portion of mobile fueling system 100 can be incorporated into a body 105 of vehicle 101. In yet another embodiment, mobile fueling system 100 can be provided separately from body 105, such as by being housed separately in a fueling system housing 106, as shown in FIG. 1A (e.g., a housing provided on a separate vehicle, or a separate housing on the same vehicle). Mobile fueling system 100 can be adapted to be transported by vehicle 101 to different locations, to allow the delivery of fuel and/or dispensing of fuel via mobile fueling system 100 at the different locations. For example, in one embodiment, mobile fueling system 100 is adapted to be transported to different locations to provide refueling services at various locations, such as refueling of vehicles at the locations.

Referring again to the embodiment in FIG. 1A, mobile fueling system 100 is depicted to comprise two recessed fueling compartments 102A and 102B, with recessed fueling compartment 102A being for the dispensing of fuel from fuel storage tank 104, and recessed fueling compartment 102B being for delivery of fuel to and/or refueling of fuel storage tank 104 (i.e., receiving fuel in fuel storage tank 104). While there are two of recessed fueling compartments 102A and 102B shown for illustrative purposes, it can also be the case that a mobile fueling system comprises only a single recessed fueling compartment, e.g. through which a fuel is both dispensed and received to and/or from fuel storage tank 104, and/or can alternatively comprise multiple recessed fueling compartments (e.g., recessed fueling compartment 102) for dispensing and/or receiving of fuel, or for dispensing and/or receiving of different fuels in a plurality of different fuel storage tanks (e.g., fuel storage tank 104).

As shown in FIGS. 1A and 1B, mobile fueling system 100 comprises a fueling lid 108 (108A, 108B in FIG. 1A) that covers a fueling compartment opening 110 (110A, 110B in FIG. 1B) that leads to recessed fueling compartment 102 (102A, 102B in FIG. 1A). As depicted in FIG. 1B, fueling lid 108 is openably attached with respect to recessed fueling compartment 102, such that opening of fueling lid 108 at least partially exposes recessed fueling compartment 102 (and an interior compartment volume 114) via fueling compartment opening 110, and closing of fueling lid 108 covers fueling compartment opening 110 and recessed fueling compartment 102 (including interior compartment volume 114).

For example, fueling lid 108 can be rotatably openable (e.g., by a hinge attachment), or can be removably attached by a mechanism that allows fueling lid 108 to be removably inserted into fueling compartment opening 110 (e.g., with a screw-in mechanism for inserting fueling lid 108 into fueling compartment opening 110), or that allows fueling lid 108 to otherwise removably cover fueling compartment opening 110. In the embodiment as shown in FIG. 1B, fueling lid 108 is attached to fueling system housing 106 of mobile fueling system 100. However, the fueling lid can also be attached to a housing comprising body 105 of vehicle 101, or can be otherwise attached with respect to recessed fueling compartment 102, such that it is capable of covering fueling compartment opening 110 to the recessed fueling compartment 102. In one embodiment, fueling lid 108 comprises a spring door attached on one side via a hinge to fueling system housing 106 (FIG. 1A) of mobile fueling system 100, where a spring mechanism can be used to at least partially open fueling lid 108 upon pressing and releasing of the lid. Furthermore, in one embodiment, at least one seal can be provided as a part of fueling lid 108 and/or otherwise about fueling compartment opening 110, such that interior compartment volume 114 is sealed to inhibit a flow of gas and/or particles into recessed fueling compartment 102 when fueling lid 108 is closed.

As shown in FIGS. 1A and 1B and as noted above, mobile fueling system 100 comprises at least one recessed fueling compartment 102 that can be accessed via fueling compartment opening 110 (e.g., located behind fueling compartment opening 110). In a different embodiment, mobile fueling system 100 can comprising a single recessed fueling compartment 102 and related components for only receiving fuel. Recessed fueling compartment 102 comprises one or more compartment walls 112 (112A, 112B in FIG. 1A) that define an interior compartment volume 114 (114A, 114B in FIG. 1A). The one or more compartment walls 112 can comprise, for example, one or more sidewalls 113 (113A, 113B in FIG. 1A), a front wall 117 (117A, 117B in FIG. 1A), and a back wall 115 that together define recessed fueling compartment 102, e.g., as shown in FIG. 1B, although other wall configurations other than those specifically shown can also be provided. Furthermore, one or more of compartment walls 112 comprise at least one recessed wall portion 111 (e.g., such as the back wall 115), that is recessed a predetermined distance away from fueling compartment opening 110, to form a compartment portion that is recessed away from (e.g., behind) fueling compartment opening 110.

Recessed fueling compartment 102 further comprises at least one fueling port 103 (103A, 103B in FIG. 1B) that can be disposed therein that are configured to couple recessed fueling compartment 102 to fuel storage tank 104. For example, fueling port 103 can be provided in at least one recessed wall portion 111, and/or in one or more others of compartment walls 112 of recessed fueling compartment 102. Fueling port 103 can also comprise a nozzle and/or hose to couple to fuel storage tank 104, as is described in more detail below.

In one embodiment, recessed fueling compartment 102 (102A, 102B in FIG. 1A) can at least in part protect fuel storage tank 104 and the contents therein from exposure to the environment when fueling lid 108 (108A, 108B in FIG. 1A) is opened for fueling from and/or refueling of fuel storage tank 104 via fueling compartment opening 110. For example, particulates and/or gases that can enter fueling compartment opening 110 (110A, 110B in FIG. 1A) upon opening of fueling lid 108 (108A, 108B in FIG. 1A) can become trapped in recessed fueling compartment 102 and contaminate fuel storage tank 104. Accordingly, recessed fueling compartment 102 can be sized and shaped to inhibit contamination of fuel storage tank 104, while also allowing for access of fueling port 103 via the fueling compartment opening 110.

Mobile fueling system 100 as depicted in FIGS. 1A and 1B further comprises at least one gas inlet 120 (120A, 120B in FIG. 1A) formed in at least one of compartment walls 112 (112A, 112B in FIG. 1A) of recessed fueling compartment 102. Gas inlet 120 is configured to introduce a gas into interior compartment volume 114 (114A, 114B in FIG. 1A), as is described in more detail below. In the embodiments as shown in FIGS. 1A and 1B, mobile fueling system 100 comprises just a single gas inlet 120 in each recessed fueling compartment 102. However, mobile fueling system 100 can also comprise a plurality of inlets in each recessed fueling compartment 102, such as a plurality of inlets formed in a plurality of compartment walls 112, and/or a gas distribution system with a plurality of inlets for introducing gas. In yet another embodiment, mobile fueling system 100 can comprise a plurality of inlets for a single one of recessed fueling compartment 102 that can be capable of introducing a plurality of different gases, and/or introducing gases at different flow rates, into interior compartment volume 114 of recessed fueling compartment 102.

Furthermore, in one embodiment, the gas introduced into interior compartment volume 114 via gas inlet 120 can be retained within recessed fueling compartment 102 when fueling lid 108 (108A, 108B in FIG. 1A) is closed (i.e. in a closed state). That is, the one or more compartment walls and fueling lid are configured such that, when the fueling lid is closed, the gas introduced into interior compartment volume 114 via gas inlet 120 is at least partially retained in recessed fueling compartment 102, to provide a predetermined pressure of the gas within recessed fueling compartment 102. For example, compartment walls 112 can form a seal with fueling lid 108 when closed, such that a flow of gas between interior compartment volume 114 and the exterior environment is inhibited and even substantially prevented. In yet another embodiment, the gas can be introduced into recessed fueling compartment 102 via gas inlet 120 when fueling lid 108 is at least partially or even fully opened (i.e., in an open state), to maintain a positive pressure of the gas in recessed fueling compartment 102 that inhibits the flow of contaminants into recessed fueling compartment 102.

In one embodiment, the gas provided into interior compartment volume 114 (114A, 114B in FIG. 1A) via gas inlet 120 (120A, 120B in FIG. 1A) is provided to at least partially protect fuel storage tank 104 and/or the fuel therein from contamination by particulate matter and/or gases that can otherwise infiltrate recessed fueling compartment 102. For example, the gas can be provided to interior compartment volume 114 to maintain a positive pressure of gas within recessed fueling compartment 102, e.g., a pressure of the gas within recessed fueling compartment 102 that is on average greater than a pressure of the environment outside recessed fueling compartment 102 when fueling lid 108 (108A, 108B in FIG. 1A) is closed against fueling compartment opening 110 (110A, 110B in FIG. 1A) (i.e., when the lid is in a closed state). For example, the gas can be provided to interior compartment volume 114 to maintain an average pressure of the gas in recessed fueling compartment 102 that is greater than about 1.01 atm (atmosphere), such as greater than about 1.05 atm, and even up to about 1.10 atm, such as up to about 1.15 atm, for example in an environment where the atmospheric pressure of the environment outside the recessed fueling compartment 102 is assumed to be that of 1013.25 millibar (mbar) at sea level (equivalent to 101.325 kiloPascals (kPa); 29.921 inches of mercury (inHg); 760.00 millimeters of mercury (mmHg)). That is, the average pressure of the gas in recessed fueling compartment 102 can be maintained a pressure in a range of from 1.01 atm to 1.15 atm, such as a range of from 1.05 atm to 1.10 atm. In yet another embodiment, a ratio of the average pressure in the recessed fueling compartment 102 with respect to an average pressure of environment external to the fueling compartment can be maintained at a certain level. For example, a ratio of the average pressure inside the recessed fueling compartment 102 to the average pressure external to the recessed fueling compartment 102 may be greater than about 1.01:1, such as greater than about 1.05:1, and even up to about 1.10:1, such as up to about 1.15:1. That is, the ratio of the average pressure inside the recessed fueling compartment 102 to the average pressure external to the recessed fueling compartment may be maintained in the range of from 1.01:1 to 1.15:1, such as in the range of from 1.05:1 to 1.10:1. In one embodiment, a pressure sensor 122 (122A, 122B in FIG. 1A) is provided to detect a pressure in recessed fueling compartment 102, such that a flow of gas into interior compartment volume 114 can be changed in relation to the detected pressure to maintain a predetermined pressure of the gas in recessed fueling compartment 102, particularly when fueling lid 108 is closed.

In yet a further embodiment, the recessed fueling compartment 102 can comprise at least one baffle 116, 136 positioned within the recessed fueling compartment 102, as shown for example in the embodiment depicted in FIG. 1B. For example, the recessed fueling compartment 102 can comprise one or more baffles, such as baffle 116, 136, positioned at corners 123 of the recessed fueling compartment 102, to reduce the number of sharp corners in the recessed fueling compartment 102 that could otherwise trap a flow of gas and/or particulates therein. That is, in one embodiment, one or more baffles, such as baffle 116, 136, may be positioned about corners 123 or other edges of the recessed fueling compartment 102, to direct a flow of gas in the recessed fueling compartment 102. The at least one baffle 116, 136 may also facilitate any occasional cleaning of the recessed fueling compartment 102, such as for example with cleaning fluid comprising a surfactant. In the embodiment as shown in FIG. 1B, baffles having a concave shape with respect to a vertical axis (e.g., baffle 116) are arranged at corners 123 located towards the bottom of the recessed fueling compartment 102, for example to re-direct gas flow and to reduce pooling of any liquids that may penetrate the recessed fueling compartment 102. In yet another embodiment, baffles having a convex shape with respect to a vertical axis (e.g., baffle 136) are arranged at corners 123 located towards a top of the recessed fueling compartment 102, for example to generate some turbulence in the reflected gas flow. The one or more baffles can also comprise another shape and/or configuration that directs a flow of gas and/or reduces pooling of liquids in the recessed fueling compartment 102.

In yet another embodiment, gas inlet 120 (120A, 120B in FIG. 1) is a part of a gas supply 124 and is configured to provide the gas from a gas source 126 to interior compartment volume 114 via, e.g., one or more gas conduits, air pumps, filters, etc. Portions of gas supply 124 can form a part of mobile fueling system 100, and/or can comprise components that are provided separately from mobile fueling system 100, such as components of vehicle 101 having mobile fueling system 100. For example, gas supply 124 can comprise gas source 126 that is a source of gas for delivery to interior compartment volume 114 of recessed fueling compartment 102. The gas source can be capable of providing, for example, at least one of air, oxygen ($O_2$), nitrogen ($N_2$), argon (Ar) or mixtures thereof, as well as different air mixtures and other inert gases and mixtures thereof. In one embodiment, gas source 126 comprises a source instrument quality air, i.e. air at class 3 or 4 or above according to compressed air standard ISO 8573.1, meaning a size of any particles in the gas is no more than 15 microns, such as no more than 5 microns, and the humidity of the gas is reduced such that a dew point of the gas is no more than 3 degrees Celsius (° C.), such as no more than −20° C., although other gases and mixtures of gases can also be provided. In one embodiment, gas source 126 is also a source of gas for separate systems of a vehicle 101, such as a source of gas for an air brake system or other vehicle system.

Gas supply 124 can, in certain embodiments, further comprise a pump 128 to pump gas from the gas source to gas inlet 120, as well as one or more filters 129 (e.g., 129A, 129B, 129C in FIG. 1A) to filter particulate material, such as microparticulate material, from the gas, before it enters interior compartment volume 114 of recessed fueling compartment 102. Other gas flow and/or filtering devices can also be provided. For example, in the embodiment as shown in FIG. 1A, gas supply 124 comprises filter 129A located downstream of gas source 126, to filter particulate material from gas source 126. Additionally, filters 129B, 129C are provided downstream of pump 128, to remove any particulate material that might be introduced by operation of pump 128. Each of filters 129 (e.g., 129A, 129B, 129C in FIG. 1) can be of the same filter type, or can be selected to filter select species from the gas, and/or to filter different sizes of particulate material from the gas. In one embodiment, at least one filter 129 can be capable of filtering particles of more than 100 microns, and even more than 50 microns, such as more than 20 microns or more than 10 microns, such as particles having a size more than 5 microns. In yet another embodiment, at least one filter 129 can be color coded to prompt replacement when nearing the end of service life. Gas supply 124 could, in certain embodiments, further comprise a dryer to dry a gas being provided to interior compartment volume 114. The gas provided to interior compartment volume 114 of recessed fueling compartment 102 via gas supply 124 can thus have a reduced level of contaminants corresponding to particulate or other material, and as such be suitable for inhibiting contamination of fuel storage tank 104. In one embodiment, the gas supplied into interior compartment volume 114 of recessed fueling compartment 102 can be filtered by at least one filter 129 to provide instrument quality gas to the recessed fueling compartment 102, as discussed above.

In one embodiment, mobile fueling system 100 that provides a flow of gas in recessed fueling compartment 102 (102A, 102B in FIG. 1A) can be capable of reducing a level of contaminants that are able to penetrate into fuel storage tank 104. For example, mobile systems and devices such as vehicle 101 are not used in a controlled environment and, therefore, can be easily exposed to numerous different types of contaminants during travel, such as dirt, dust, metal particulates, rubber particulates, and organic materials, which can otherwise penetrate into fueling systems to contaminate stored fuel, with possible deleterious consequences not only for vehicle performance, but also for overall vehicle product life. For example, for vehicles that use a hydrogen fuel, contamination of hydrogen stored in a storage tank can result not only in less efficient running of the vehicle, but can also potentially damage internal fuel cell parts or other electrochemical components necessary for powering and running the vehicles. Contamination of fuels other than hydrogen can also be problematic. Accordingly, in one embodiment, mobile fueling system 100 is provided to reduce contamination of a stored fuel that is a gas fuel, such as at least one of hydrogen gas and natural gas. In yet another embodiment, mobile fueling system 100 can be provided to reduce contamination of a stored fuel that is a liquid fuel, such as conventional gasoline or even a liquid form of a material that is otherwise found in a gas phase at ambient temperatures and pressures, such as liquid hydrogen. In one embodiment, mobile fueling system 100 is provided to inhibit contamination of a hydrogen fuel stored in, or intended for refueling of, a hydrogen fuel cell electric vehicle (FCEV).

In one embodiment, mobile fueling system 100 can comprise one or more components, connections, etc., that are suitable for transfer and handling of hydrogen. For example, referring to FIG. 1A mobile fueling system 100 can comprise fueling ports 103A, 103B on one or more of recessed fueling compartments 102A, 102B that are configured to be suitable for the transfer of hydrogen gas into or out of fuel storage tank 104. Furthermore, fuel storage tank 104, which can be provided as a part of mobile fueling system 100 or as a separate component, can also be configured to store a compressed volume of gas, such as hydrogen gas. In one embodiment, recessed fueling compartment 102B corresponding to a fuel receiving compartment is configured to receive a fuel to refill a fuel storage tank 104, such as a hydrogen fuel, and can comprise fueling port 103B that is adapted to receive a hydrogen fueling nozzle. In another embodiment, recessed fueling compartment 102A corresponding to a fuel dispensing compartment comprises a fuel dispensing nozzle 130 (FIGS. 2A and 2B) that is configured to dispense hydrogen fuel from fuel storage tank 104 to, e.g., another mobile device such as a vehicle.

Figure 2A:
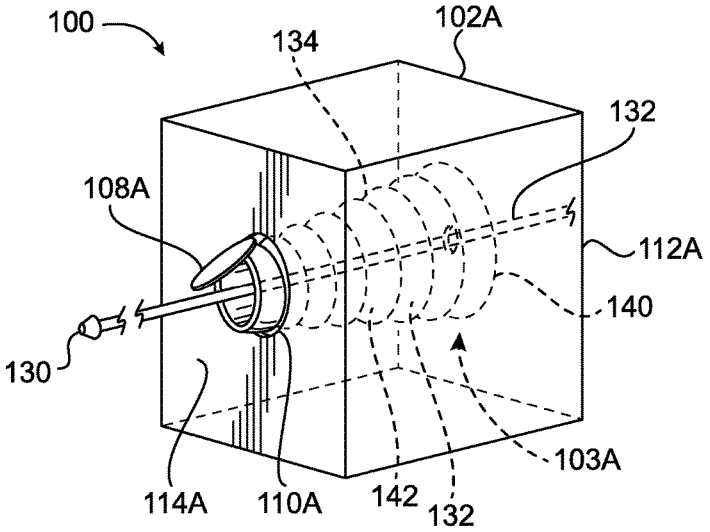
FIG. 2A illustrates a partial front, isometric, "x-ray" view of a fuel dispensing nozzle and hose for use with at least a portion of the mobile fueling system of FIG. 1A, according to one embodiment.
Figure 2B:
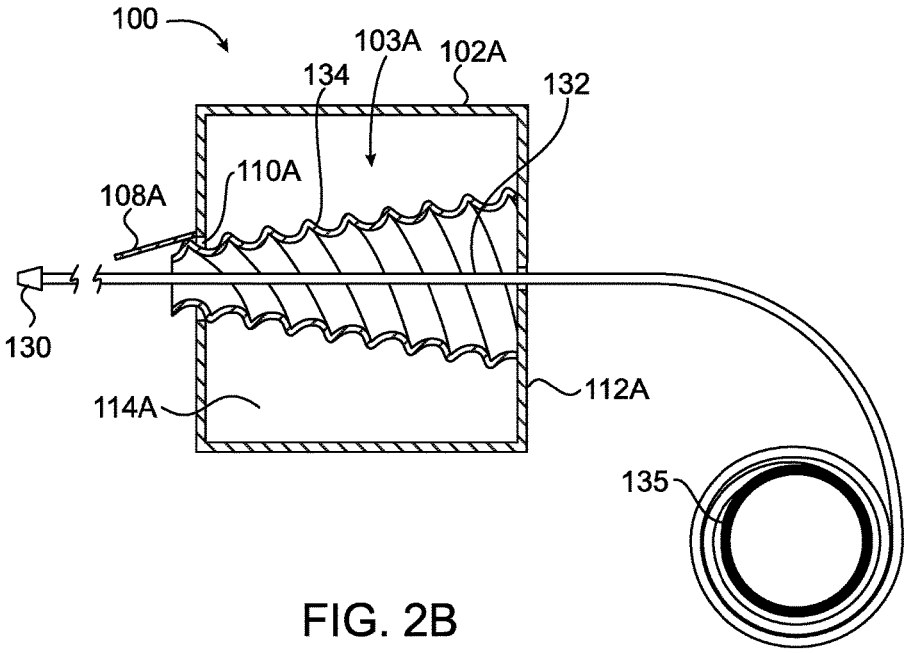
FIG. 2B illustrates a cross-sectional view of the fuel dispensing nozzle and hose of FIG. 2A for use with at least a portion of the mobile fueling system of FIG. 1A.

For example, as shown in the embodiments depicted in FIGS. 2A and 2B, a portion of mobile fueling system 100 has fueling port 103A comprising a fuel dispensing nozzle 130 coupled to an extendible hose 132 that is capable of being extended at least partially through fueling compartment opening 110A and outside of recessed fueling compartment 102A, to dispense the hydrogen fuel (or optionally other fuel) to a location external to recessed fueling compartment 102A. Extendible hose 132 can further be retractable, for example, for storage of extendible hose 132 either in recessed fueling compartment 102A, or outside of or in a separate compartment, e.g., behind compartment walls 112A of recessed fueling compartment 102A, for example as shown in FIG. 2B. The retractable nature of extendible hose 132 can be manual, automatic, or partially automatic.

For example, extendible hose 132 can be retractable by winding extendible hose 132 on a reel 135 for storage thereof. Furthermore, reel 135 or other device provided for winding and storage of extendible hose 132 can comprise a bend limiting device that limits a bend radius of extendible hose 132, for example to inhibit constriction of the hose. For example, in one embodiment, the bend limiting device can comprise a circular reel having a diameter that is sufficiently large such that a diameter of a hose turn when extendible hose 132 is wound onto the circular reel is no less than 8 inches, such as no less than 10 inches and even no less than 12 inches, for example the diameter may be in the range of from 10 inches to 12 inches. In the embodiment as shown in FIG. 2B, extendible hose 132 can be wound onto reel 135 stored behind compartment walls 112A for storage thereof, and is extendible by unwinding to extend extendible hose 132 and fuel dispensing nozzle 130 through an aperture formed in one of compartment walls 112A of recessed fueling compartment 102, and externally to recessed fueling compartment 102A for delivery of fuel from fuel storage tank 104 (FIG. 1B) to another device and/or vehicle. An end of extendible hose 132 that is opposite fuel dispensing nozzle 130 is in communication with fuel storage tank 104 (FIG. 1B), to allow for transfer of a fuel such as hydrogen gas from fuel storage tank 104 (FIG. 1B) through extendible hose 132 and to fuel dispensing nozzle 130 for delivery of the fuel.

In yet a further embodiment, as depicted in FIGS. 2A and 2B, extendible hose 132 comprises a protective sleeve 134, which is optional, about a circumference of extendible hose 132, to further inhibit contamination of extendible hose 132, such as by airborne contaminants that could otherwise contaminate mobile fueling system 100. In the embodiment as depicted in FIGS. 2A and 2B, protective sleeve 134 comprises a protective base 140 that is disposed about a circumference of a base of extendible hose 132, and an expandable/compressible sleeve body 142 that expands in response to an extension of (and/or that contracts in response to a compression of) extendible hose 132, to provide coverage and protection along a portion of the length of extendible hose 132, particularly near fuel dispensing nozzle 130.

For example, as shown in FIG. 2B, in one embodiment, protective base 140 can be anchored to a portion of compartment walls 112A of recessed fueling compartment 102A, such as a back wall 115 (FIG. 1B) of compartment walls 112A. Expandable/compressible sleeve body 142 can extend from recessed fueling compartment 102A through fueling compartment opening 110A, and can be expandable with the extension of extendible hose 132. That is, expandable/compressible sleeve body 142 can be capable of telescoping or expanding in an accordion-like fashion, such that expandable/compressible sleeve body 142 can be stored in relatively compact fashion within recessed fueling compartment 102A when extendible hose 132 is not in use, but can be extended in concert with unwinding and/or extension of extendible hose 132 to maintain a protective barrier about extendible hose 132, particularly near fuel dispensing nozzle 130. Protective sleeve 134 can be capable of extending along substantially the entire length of extendible hose 132 in one embodiment, or alternatively can extend only along a portion of the length of extendible hose 132, such as along a length of extendible hose 132 that is within recessed fueling compartment 102A (e.g., the hose can be capable of being extended beyond a length of protective sleeve 134). In one embodiment, protective sleeve 134 comprises a barrier material that acts as a barrier to penetration of particulate and other airborne contaminants. In yet another embodiment, at least a portion of protective sleeve 134 can be attached to fueling lid 108A, such that protective sleeve 134 at least partially and automatically expands upon opening of fueling lid 108A to protect interior compartment volume 114A of recessed fueling compartment 102A.

In another embodiment, protective base 140 is not affixed to recessed fueling compartment 102A, but instead can be affixed to extendible hose 132 near fuel dispensing nozzle 130. For example, protective base 140 can be affixed to extendible hose 132 within 10-50 centimeters of fuel dispensing nozzle 130. In this same embodiment, the other end of protective sleeve 134 can be affixed to an end of fuel dispensing nozzle 130 that is opposite a distal tip of fuel dispensing nozzle 130 and/or can be affixed to an end of extendible hose 132 that is closer to fuel dispensing nozzle 130 than protective base 140.

In yet another embodiment, one or more structures and/or surfaces in the recessed fueling compartment 102 can be formed of a material that is resistant to corrosion, wear, cracking, and/or particulate formation, for example to reduce incidence of contamination of the recessed fueling compartment 102 and/or a fuel being dispensed from or delivered to the fuel storage tank 104. For example, any one or more of the compartment walls 112, fueling port 103, fuel dispensing nozzle 130, fueling lid 108, baffle 116, as well as portions and/or surfaces thereof, can comprise a corrosion and/or wear-resistant material. In one embodiment, the one or more structures and/or surfaces in the recessed fueling compartment 102 can comprise a stainless steel material, such as an uncoated stainless steel material (e.g., a unitary stainless steel body of material), so as to reduce any contaminants that could otherwise be generated by cracking and/or delamination of a coated material were provided. For example, suitable stainless steel materials that can be used to form at least a portion of one or more structures and/or surfaces in the recessed fueling compartment 102 can comprise stainless steel of grades 304, 304L, 326 and 3116L (per SAE International).

Returning to FIG. 1A, in one embodiment, a control system 150 is provided to control various components of mobile fueling system 100. For example, control system 150 can comprise one or more computer systems (such as computer system 300) that are capable of receiving input from and providing instructions to components of mobile fueling system 100. Control system 150 can further comprise one or more pressure sensors (such as pressure sensor 122 (122A, 122B in FIG. 1A)) to detect a pressure in recessed fueling compartment 102, as well as one or more detectors 148 (148A, 148B in FIG. 1A) to detect opening and/or closing of fueling lid 108, such as by detecting engagement of fueling lid 108 to recessed fueling compartment 102, or by other techniques.

Control system 150 can further be capable of operating a component of gas supply 124, such as pump 128, or another flow control device to control a flow of gas into recessed fueling compartment 102. For example, in one embodiment, control system 150 can operate by having the computer system 300 receive information as to one or more of a pressure from pressure sensor 122 (122A, 122B in FIG. 1A), a flow rate from pump 128, or a lid open/closed state (or motion to close the lid) from detector 148 (148A, 148B in FIG. 1A). Computer system 300 can then be able to provide instructions to one or more components of mobile fueling system 100 on the basis of this information. For example, computer system 300 can be capable of providing instructions to pump 128 to change a flow rate of gas being introduced into recessed fueling compartment 102, and/or to gas source 126 or other components of gas supply 124, to instruct the setting of parameters that will provide a predetermined flow rate and/or pressure in recessed fueling compartment 102, and/or that will change the flow rate and/or pressure by a predetermined amount. Computer system 300 can monitor information received from, e.g., pump 128, pressure sensor 122, and detector 148, to determine whether a predetermined gas flow rate and/or pressure has been achieved, and/or whether an opening and/or closing of fueling lid 108 (108A, 108B in FIG. 1A) has been detected that can require a change in pressure and/or flow rate of the gas.

In one embodiment, control system 150 is a part of mobile fueling system 100. However, portions and even all of control system 150 can be embodied separately from mobile fueling system 100, such as in the control and electronics of vehicle 101 (FIG. 1B) or another mobile device. Further description of a computer system (such as computer system 300) that is capable of communicating with the components of mobile fueling system 100 to form control system 150 is provided below.

In one embodiment, control system 150 is configured to detect at least one of opening or closing of fueling lid 108 (108A, 108B in FIG. 1A), such as via detector 148 (148A, 148B in FIG. 1A), and to change a flow rate of the gas into interior compartment volume 114 (114A, 114B in FIG. 1A) of the recessed fueling compartment 102 (102A, 102B in FIG. 1A) in relation thereto (e.g., upon or after detection), such as by controlling a flow rate of the gas via pump 128. The flow rate can be changed from a first flow rate to a second flow rate, where the first flow rate can be less or more than the second flow rate. Furthermore, in one embodiment, the flow rate can be changed at a point in time that is any of before, during, or after, dispensing of fuel from, or delivering fuel to, fuel storage tank 104. For example, in one embodiment, control system 150 can be configured to detect opening of fueling lid 108, and to increase or decrease a flow rate of the gas into interior compartment volume 114 for at least a predetermined period of time in response to such detection (e.g., upon or after detection). That is, in one embodiment, a flow rate of the gas can be increased upon or after detection of opening of fueling lid 108, for example to at least partially purge recessed fueling compartment 102 of particular and/or other contaminants upon opening of fueling lid 108. For example, the flow rate of gas can be increased by initiating the flow of gas when fueling lid 108 is opened, or by simply increasing the flow rate above a rate of the gas that was maintained when fueling lid 108 was closed, or increasing to a rate sufficient to flush or purge contaminants from recessed fueling compartment 102. In another embodiment, a flow rate of the gas is decreased upon or after detection of opening of fueling lid 108, for example to reduce an amount of gas that is wasted in escaping from recessed fueling compartment 102 while the lid is open. For example, the flow rate of gas can be decreased below the flow rate maintained prior to opening fueling lid 108, or the flow rate can be halted altogether following opening of fueling lid 108.

As another example, in one embodiment, control system 150 can be configured to detect closing of fueling lid 108 (108A, 108B in FIG. 1A), and to increase or decrease a flow rate of the gas for at least a predetermined period of time into interior compartment volume 114 (114A, 114B in FIG. 1A) in relation thereto (e.g., upon or after detection). That is, in one embodiment, a flow rate of the gas can be increased upon or after detection of closing fueling lid 108, for example to re-establish a predetermined pressure in recessed fueling compartment 102 (102A, 102B in FIG. 1A). For example, the flow rate of gas can be increased by initiating the flow of gas when fueling lid 108 is closed, or by simply increasing the flow rate above a rate of the gas that was maintained when fueling lid 108 was opened, or increasing to a rate sufficient to provide a predetermined pressure in recessed fueling compartment 102. In another embodiment, a flow rate of the gas is decreased upon or after detection of closing of fueling lid 108, for example to reduce an amount of gas used when recessed fueling compartment 102 is closed off from the external environment. For example, the flow rate of gas can be decreased below the flow rate maintained prior to closing fueling lid 108, or the flow rate can be halted altogether following closing of fueling lid 108.

Furthermore, in yet another embodiment, control system 150 can maintain the same flow rate of the gas into recessed fueling compartment 102 (102A, 102B in FIG. 1A), regardless of opening or closing of fueling lid 108 (108A, 108B in FIG. 1A). For example, the flow rate of gas into recessed fueling compartment 102 can be maintained substantially the same between time points including any one or more of (i) prior to opening of fueling lid 108, (2) after opening of fueling lid 108, (3) before closing of fueling lid 108, and (4) after closing of fueling lid 108. That is, for example, in one embodiment the flow rate can be substantially the same during any of opening and/or closing of fueling lid 108.

In yet another embodiment, the flow rate of the gas can be changed after a predetermined period of time has elapsed following opening or closing of fueling lid 108 (108A, 108B in FIG. 1A). For example, control system 150 can control components of vehicle 101 (FIG. 1B) or other mobile system, such that any change in flow rate is initiated only after a predetermined period of time has elapsed following opening and/or closing of fueling lid 108. In one embodiment, a flow rate of the gas is decreased once a predetermined period of time has elapsed after closing of fueling lid 108, such as once a predetermined pressure of the gas in recessed fueling compartment 102 (102A, 102B in FIG. 1A) has been achieved. In yet another embodiment, a flow rate of the gas is decreased once a predetermined period of time has elapsed after opening of fueling lid 108, so as to reduce a waste of gas. For example, in one embodiment, a flow rate of the gas can be increased upon or after detection of opening of fueling lid 108 or shortly thereafter, to provide an initial purge of recessed fueling compartment 102 with opening of fueling lid 108, and the flow rate can thereafter be decreased, after a sufficient purge has been provided.

In yet another embodiment, a motion to close fueling lid 108 (108A, 108B in FIG. 1A) is detected, prior to full closure of fueling lid 108, and a flow rate of the gas can be changed in relation to such motion (e.g., upon or after detection of the motion), such as for example to increase the gas flow rate to provide a final purge of the recessed fueling compartment 102 (102A, 102B in FIG. 1A) before fueling lid 108 is closed. For example, upon or after detecting imminent closing of fueling lid 108, such by detecting a motion of fueling lid 108 towards the closed state, the pressure of the gas can be increased to provide a purge of recessed fueling compartment 102, after which the flow rate can be decreased upon closing of fueling lid 108 and/or a predetermined period of time after closing fueling lid 108.

Furthermore, while the flow rate is discussed with regard to control by control system 150 that is in communication with detector 148 (148A, 148B in FIG. 1A) to detect opening/closing of fueling lid 108 (108A, 108B in FIG. 1A), in one embodiment the flow rate can be changed automatically without instructions from control system 150 by opening and/or closing of fueling lid 108, such as by automatically flipping a switch or setting a timer to increase and/or decrease gas flow upon or after opening and/or closing of fueling lid 108, including by initiating or halting gas flow, upon or after opening and/or closing of fueling lid 108.

In a further embodiment, control system 150 can be capable of controlling various components of mobile fueling system 100 to maintain and/or change a pressure in recessed fueling compartment 102 (102A, 102B in FIG. 1A). The pressure can be changed from a first pressure to a second pressure, where the first pressure is either less than or more than the second pressure. The change in pressure can occur, in one embodiment, before during or after dispensing of fuel from or delivering fuel to fuel storage tank 104. For example, Control system 150 can communicate with pressure sensor 122 (122A, 12B in FIG. 1A) and detector 148 (148A, 148B in FIG. 1B), and provide gas flow control instructions to pump 128 or other gas flow control device to maintain and/or change a pressure in recessed fueling compartment 102, such as in relation to detection of opening and/or closing of fueling lid 108 (108A, 108B in FIG. 1A) (e.g., upon or after detection).

For example, in one embodiment, control system 150 can be configured to detect opening of fueling lid 108 (108A, 108B in FIG. 1A), and to increase or decrease a pressure of the gas into interior compartment volume 114 (114A, 114B in FIG. 1A). That is, in one embodiment, a pressure of the gas can be increased upon or after detection of opening of fueling lid 108, for example to at least partially purge recessed fueling compartment 102 (102A, 102B in FIG. 1A) of particulates and/or other contaminants upon opening of fueling lid 108, and to maintain a positive pressure of the gas in recessed fueling compartment 102 with respect to the external environment. For example, the pressure of gas can be increased by initiating the flow of gas when fueling lid 108 is opened, or by simply increasing the flow rate to provide a pressure of the gas that is higher than what was maintained when fueling lid 108 was closed, or increasing to a pressure that is sufficient to flush or purge contaminants from recessed fueling compartment 102. In another embodiment, a pressure of the gas is decreased upon or after detection of opening of fueling lid 108, for example to reduce an amount of gas that is wasted in escaping from recessed fueling compartment 102 while fueling lid 108 is open. For example, the pressure of gas can be decreased below the pressure maintained prior to opening fueling lid 108, or the pressure can be allowed to equilibrate to the external pressure by halting the flow of gas altogether following opening of fueling lid 108.

As another example, in one embodiment, control system 150 can be configured to detect closing of fueling lid 108 (108A, 108B in FIG. 1A), and to increase or decrease a pressure of the gas in interior compartment volume 114 (114A, 114B in FIG. 1A) in relation thereto (e.g., upon or after detection). That is, in one embodiment, a pressure of the gas can be increased upon or after detection of closing of fueling lid 108, for example to re-establish a predetermined pressure in recessed fueling compartment 102 (102A, 102B in FIG. 1A). For example, the pressure of gas can be increased by initiating the flow of gas when fueling lid 108 is closed, or by simply maintaining a flow rate of gas into recessed fueling compartment 102 that was provided when the lid was open, until a predetermined pressure in the closed compartment is achieved, or by increasing the flow rate above a rate that was maintained when fueling lid 108 was opened. In another embodiment, a pressure of the gas is decreased upon or after detection of closing of fueling lid 108, for example to reduce an amount of gas used when recessed fueling compartment 102 is closed off from the external environment. For example, the pressure of gas can be decreased by decreasing the flow rate maintained prior to closing fueling lid 108, or the pressure can be decreased by halting the flow rate altogether following closing of fueling lid 108.

Furthermore, in yet another embodiment, control system 150 can maintain the same pressure of the gas in recessed fueling compartment 102 (102A, 102B in FIG. 1A), regardless of the opening or closing of fueling lid 108 (108A, 108B in FIG. 1A), such as by increasing a flow of gas into recessed fueling compartment 102 when fueling lid 108 is opened, and decreasing the flow of gas into recessed fueling compartment 102 when fueling lid 108 is closed. Also, the pressure of the gas can be changed only after a predetermined period of time has elapsed following opening or closing of fueling lid 108. For example, control system 150 can control components of mobile fueling system 100 such that any change in pressure is initiated only after the predetermined period of time has elapsed following opening and/or closing of fueling lid 108. In one embodiment, a pressure of the gas is decreased once a predetermined period of time has elapsed after opening of fueling lid 108, so as to reduce a waste of gas. For example, in one embodiment, a pressure of the gas can be increased upon detection of opening of fueling lid 108 or shortly thereafter, to provide an initial purge of the compartment with opening of fueling lid 108, and the pressure can thereafter be decreased, after sufficient purge has been provided. In yet another embodiment, a motion to close fueling lid 108 is detected, prior to full closure of the lid, and a pressure of the gas can be changed in relation to such motion (e.g., upon or after detection of the motion), such as for example to provide a final purge of recessed fueling compartment 102 before fueling lid 108 is closed. For example, upon or after detecting imminent closing of fueling lid 108, such by detecting a motion of fueling lid 108 towards the closed state, the pressure of the gas can be increased to provide a purge of recessed fueling compartment 102, after which the pressure can be decreased upon closing fueling lid 108 and/or a predetermined period of time after closing fueling lid 108.

Furthermore, while the pressure is discussed with regard to control by control system 150 that is in communication with detector 148 (148A, 148B in FIG. 1A) to detect opening/closing of fueling lid 108 (108A, 108B in FIG. 1A), in one embodiment the pressure can be changed automatically without instructions from the control system 150 by opening and/or closing of fueling lid 108, such as by automatically flipping a switch or setting a timer to increase and/or decrease gas flow to change the pressure upon or after opening and/or closing of fueling lid 108, including by initiating or halting gas flow, upon or after opening and/or closing of fueling lid 108.

Figure 3:
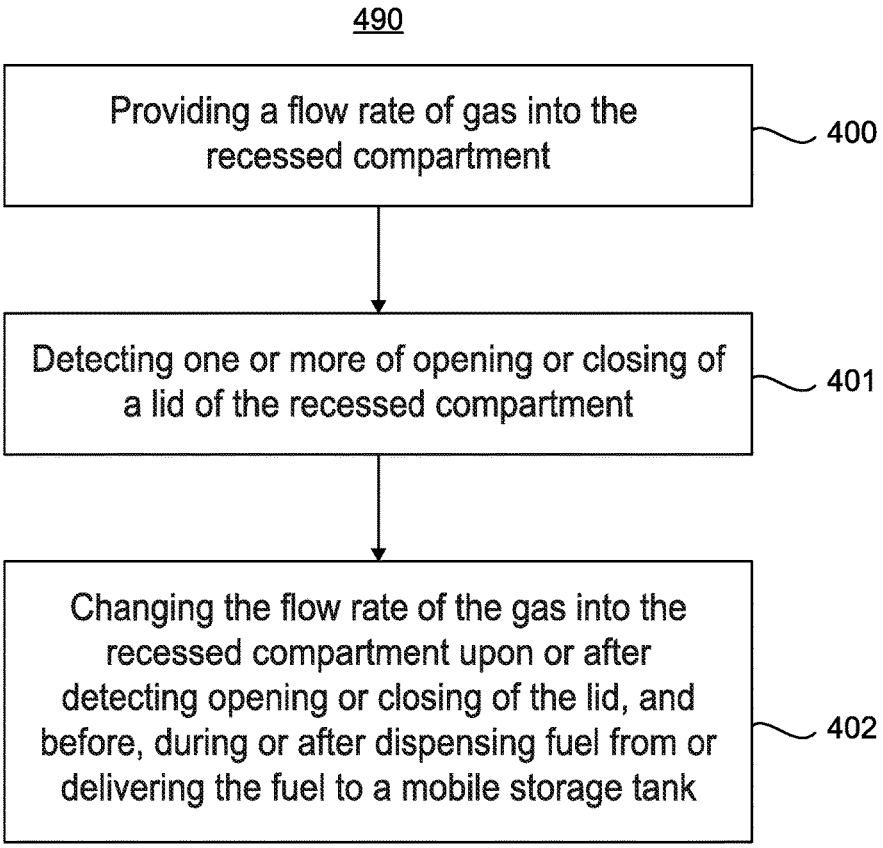
FIG. 3 illustrates a flow chart for a method, according to an embodiment.
Figure 4:
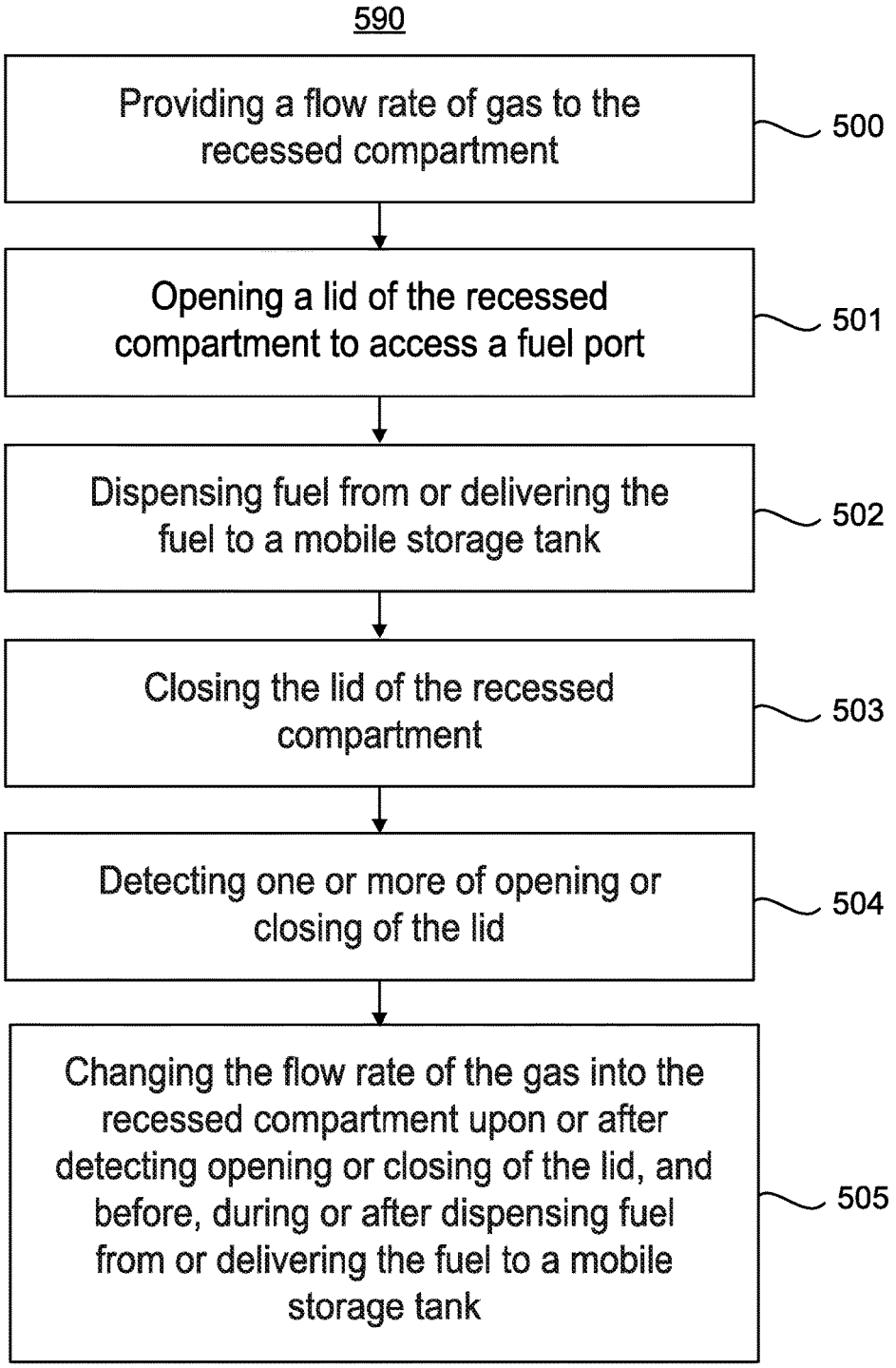
FIG. 4 illustrates a flow chart for a method, according to an embodiment.

Turning ahead in the drawings, FIGS. 3 and 4 depict flow charts showing embodiments of methods of operating mobile fueling system 100 (FIGS. 1A, 1B, 2A 2B), to dispense fuel from or delivering fuel to a mobile fuel storage tank 104 (FIGS. 1A, 1B), having fueling port 103 (FIGS. 1A, 1B, 2A 2B) in recessed fueling compartment 102 (FIGS. 1A, 1B, 2A 2B). In one embodiment, one or more parts of the methods can be implemented via computer instructions configured to run at one or more processing modules, and configured to be stored at one or more memory storage modules of computer system 300 (FIGS. 1A, 1B), as is described in more detail below. Portions of the methods can also be implemented separately form computer system 300 (FIGS. 1A, 1B), such as for example with a cloud computer system, third-party computer system, and/or other personal computing system. Furthermore, the methods shown herein are merely exemplary, and the methods are not limited to the embodiments or examples specifically depicted herein.

For example, in the embodiment depicted in FIG. 3, a method 490 of operating a mobile fuel system (e.g., mobile fueling system 100) can comprise a procedure 400 of providing a flow rate of gas into a recessed fueling compartment, such as for example by controlling a flow of gas pumped to the compartment by a pump. Method 490 can further comprise procedure 401 of detecting one or more of opening or closing of a fueling lid for the recessed fueling compartment. For example, procedure 401 can detect that the fueling lid has been opened when the fueling lid is opened by a person to allow for the dispensing of fuel from, or delivery of fuel to, a fuel storage tank via the recessed fueling compartment, such as by receiving information from a detector that detects opening/closing of the fueling lid. As another example, procedure 401 can detect that the fueling lid has been closed, such as by a person completing a fuel delivery and/or fuel dispensing process, by receiving information from the detector that the fueling lid has been closed. As an example, the recessed fueling compartment, pump, fueling lid, fuel storage tank and detector of procedures 400 and/or 401 of method 490 can be the same as and/or similar to the recessed fueling compartment 102 (FIGS. 1A, 1B, 2A, 2B) (102A, 102B in FIG. 1A), pump 128 (FIG. 1A), fueling lid 108 (FIGS. 1A, 1B, 2A, 2B) (108A, 108B in FIG. 1A), fuel storage tank 104 (FIG. 1B) and detector 148 (FIG. 1A, 1B) (148A, 148B in FIG. 1A), respectively, as described above.

Method 490 can further comprise a procedure 402 of changing a flow rate of gas into the recessed fueling compartment upon or after detecting opening or closing of the fueling lid, and before, during or after dispensing fuel from or delivering the fuel to the fuel storage tank. For example, the procedure 402 can comprise any of those described above for increasing and/or decreasing a flow rate and/or pressure of a gas in a recessed fueling compartment in relation to (e.g., upon or after) opening and/or closing of the lid, such as by controlling a rate of flow of gas to the recessed fueling compartment by controlling the pump. In one embodiment, the flow rate of gas into the recessed fueling compartment is initiated in relation to (e.g., upon or after) detecting opening or closing of the fueling lid. In yet another embodiment, the flow rate of gas into the recessed fueling compartment is increased in relation to (e.g., upon or after) detecting opening or closing of the fueling lid. In a further embodiment, the flow rate of gas into the recessed fueling compartment is reduced in relation to (e.g., upon or after) detecting opening or closing of the fueling lid. In yet a further embodiment, the flow rate of gas into the recessed fueling compartment is ceased in relation to (e.g., upon or after) detecting opening or closing of the fueling lid. In yet another embodiment, the flow rate of gas is changed in procedure 402 only after a predetermined period of time has elapsed after closing or opening of the fueling lid is detected. As an example, the recessed fueling compartment, pump, fueling lid, fuel storage tank and detector of procedure 402 of method 490 can be the same as and/or similar to recessed fueling compartment 102 (FIGS. 1A, 1B, 2A, 2B) (102A, 102B in FIG. 1A), pump 128 (FIG. 1A), fueling lid 108 (FIGS. 1A, 1B, 2A, 2B) (108A, 108B in FIG. 1A), fuel storage tank 104 (FIG. 1B) and detector 148 (FIG. 1A, 1B) (148A, 148B in FIG. 1A), respectively, as described above.

FIG. 4 depicts yet another embodiment of a method 590 of operating the mobile fueling system. In method 590, a procedure 500 comprises providing a flow rate of gas to the recessed fueling compartment, and can be performed similarly to procedure 400 of the embodiment of method 490 (FIG. 3). Method 590 can further comprise, in a procedure 501, opening a fueling lid of a recessed fueling compartment to access a fuel port, such as to deliver fuel to or dispense fuel from, a fuel storage tank, via the recessed fueling compartment. Method 590 further comprises, in a procedure 502, dispensing fuel from, or delivering fuel to, a fuel storage tank. For example, a person seeking to refill the fuel storage tank can deliver fuel to the storage tank via the fueling port in the recessed fueling compartment, whereas a person seeking to access the fuel storage tank to obtain fuel for a separate device, such as to re-fuel a separate vehicle or other mobile device, can dispense fuel from the fuel storage tank via the fueling port, such as via an extendible hose with a fuel dispensing nozzle protected by a protective sleeve.

Method 590 further comprises, in a procedure 503, closing the fueling lid of the recessed fueling compartment, such as after refilling the fuel storage tank, or after refueling of another vehicle or mobile device is completed. Next, method 590 comprises, in a procedure 504 of detecting one or more of opening or closing of the fueling lid of the recessed fueling compartment, which procedure can be performed similarly to procedure 401 of method 490 depicted in FIG. 3 as described above. Method 590 also comprises, in a procedure 505, changing a flow rate of gas into the recessed fueling compartment upon or after detecting the opening or closing of the fueling lid in procedure 504, and before, during or after dispensing fuel from or delivering fuel to the fuel storage tank. Procedure 505 can be performed similarly to procedure 402 of method 490 (FIG. 3) as described above, such as by increasing or decreasing a flow of gas into the recessed fueling compartment in relation to (e.g., upon or after) the detection of opening and/or closing of the fueling lid. Furthermore, in one embodiment, the flow rate of gas into the recessed fueling compartment can be changed before, during or after any one of procedures 500-504 described above. As an example, the recessed fueling compartment, pump, fueling lid, fuel storage tank, fueling port, fuel dispensing nozzle, extendible hose, protective sleeve, detector, and vehicle of procedures 500-505 of method 590 can be the same as and/or similar to recessed fueling compartment 102 (FIGS. 1A, 1B, 2A, 2B) (102A, 102B in FIG. 1A), pump 128 (FIG. 1A), fueling lid 108 (FIGS. 1A, 1B, 2A, 2B) (108A, 108B in FIG. 1A), fuel storage tank 104 (FIG. 1B), fueling port 103 (FIG. 1A, 1B, 2A, 2B) (103A, 103B in FIG. 1A), fuel dispensing nozzle 130 (FIG. 2A, 2B), extendible hose 132 (FIG. 2A, 2B), protective sleeve 134 (FIG. 1A, 2B), detector 148 (FIG. 1A, 1B) (148A, 148B in FIG. 1A) and vehicle 101 (FIG. 1B), respectively, as described above.

Figure 7:
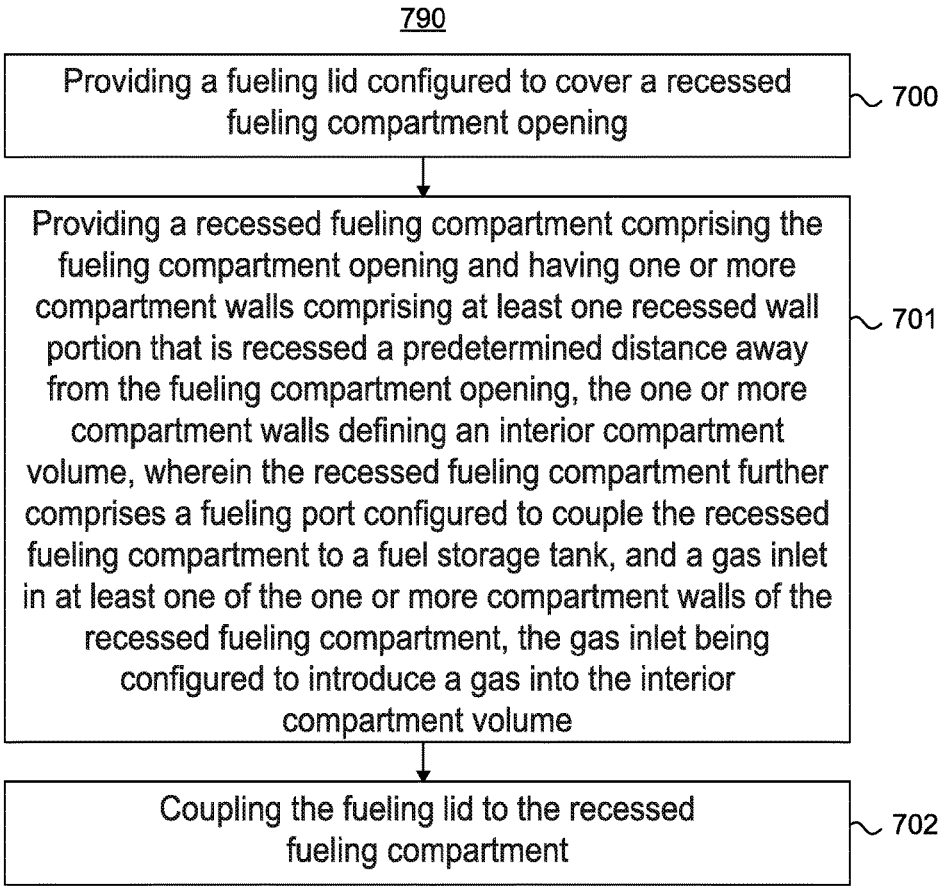
FIG. 7 illustrates a flow chart for a method, according to an embodiment.

In one embodiment, a method 790 of manufacturing a mobile fueling system having a recessed fueling compartment is provided, as shown in FIG. 7. Method 790 includes, in procedure 700, providing a fueling lid, and in procedure 701, providing a recessed fueling compartment, such as those described above. For example, in one embodiment, the method 790 comprises, in procedure 700, providing a fueling lid configured to cover a fueling compartment opening, and in procedure 701 providing a recessed fueling compartment comprising the fueling compartment opening and having one or more compartment walls comprising at least one recessed wall portion that is recessed a predetermined distance away from the fueling compartment opening. The one or more compartment walls can define an interior compartment volume. The recessed fueling compartment can comprise a fueling port configured to couple the recessed fueling compartment to a fuel storage tank, and a gas inlet formed in at least one of the one or more compartment walls of the recessed fueling compartment. The gas inlet can be configured to introduce a gas into the interior compartment volume. Method 790 further can further comprise, in procedure 702, coupling the fueling lid to the recessed fueling compartment. In further embodiments, method 790 can comprise providing the recessed fueling compartment and fueling lid, and forming a gas inlet in at least one wall of the recessed fueling compartment, either before, during or after coupling of the recessed fueling compartment to the fueling lid. As an example, the mobile fueling system, recessed fueling compartment, fueling compartment opening, fueling lid, fuel storage tank, fueling port, one or more compartment walls, recessed wall portion, interior compartment volume and gas inlet of procedures 700-702 of method 790 can be the same as and/or similar to mobile fueling system 100 (FIGS. 1A, 1B, 2A, 2B) recessed fueling compartment 102 (FIGS. 1A, 1B, 2A, 2B) (102A, 102B in FIG. 1A), fueling compartment opening 110 (FIGS. 1A, 1B, 2A, 2B) (110A, 110B in FIG. 1A), fueling lid 108 (FIGS. 1A, 1B, 2A, 2B) (108A, 108B in FIG. 1A), fuel storage tank 104 (FIG. 1B), fueling port 103 (FIG. 1A, 1B, 2A, 2B) (103A, 103B in FIG. 1A), one or more compartment walls 112 (FIGS. 1A, 1B, 2A, 2B) (112A, 112B in FIG. 1A), recessed wall portion 111 (FIG. 1B), interior compartment volume 114 (FIGS. 1A, 1B, 2A, 2B) (114A, 114B in FIG. 1A), and gas inlet 120 (FIGS. 1A, 1B) (120A, 120B in FIG. 1A), respectively, as described above.

Figure 5:
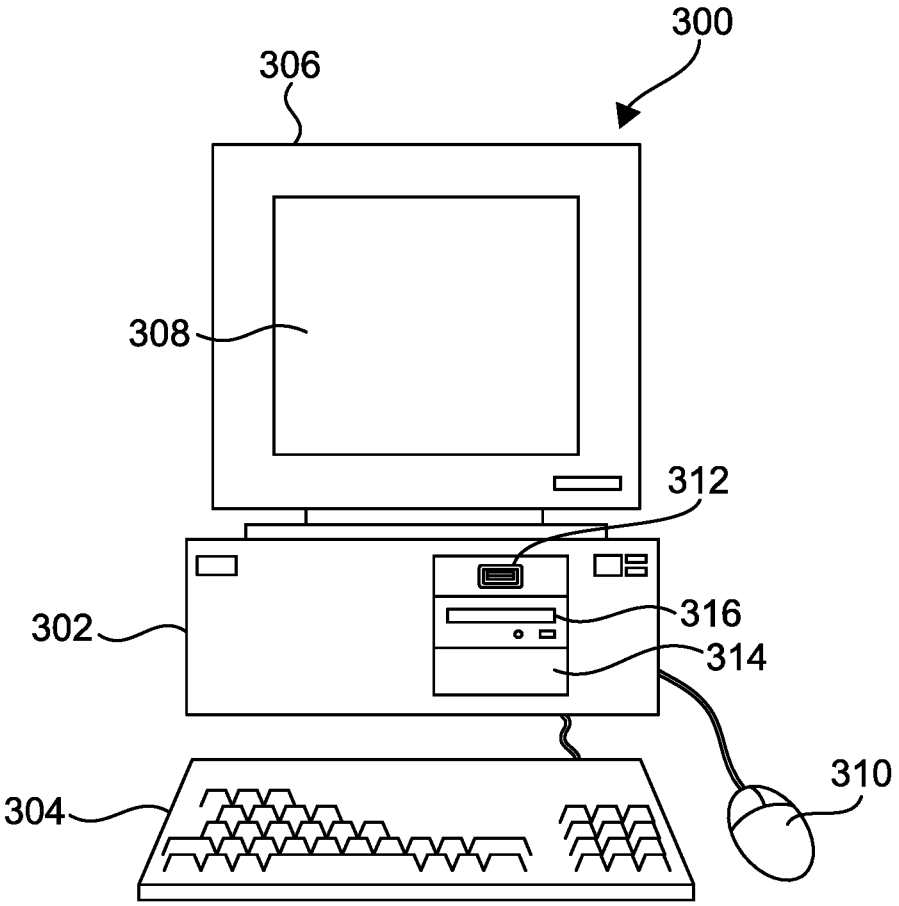
FIG. 5 illustrates a front elevational view of an exemplary computer system that is suitable to implement at least part of one or more user computer systems, and/or to implement at least part of one or more of the activities of the methods of FIG. 3 or 4, or one or more other methods described herein.
Figure 6:
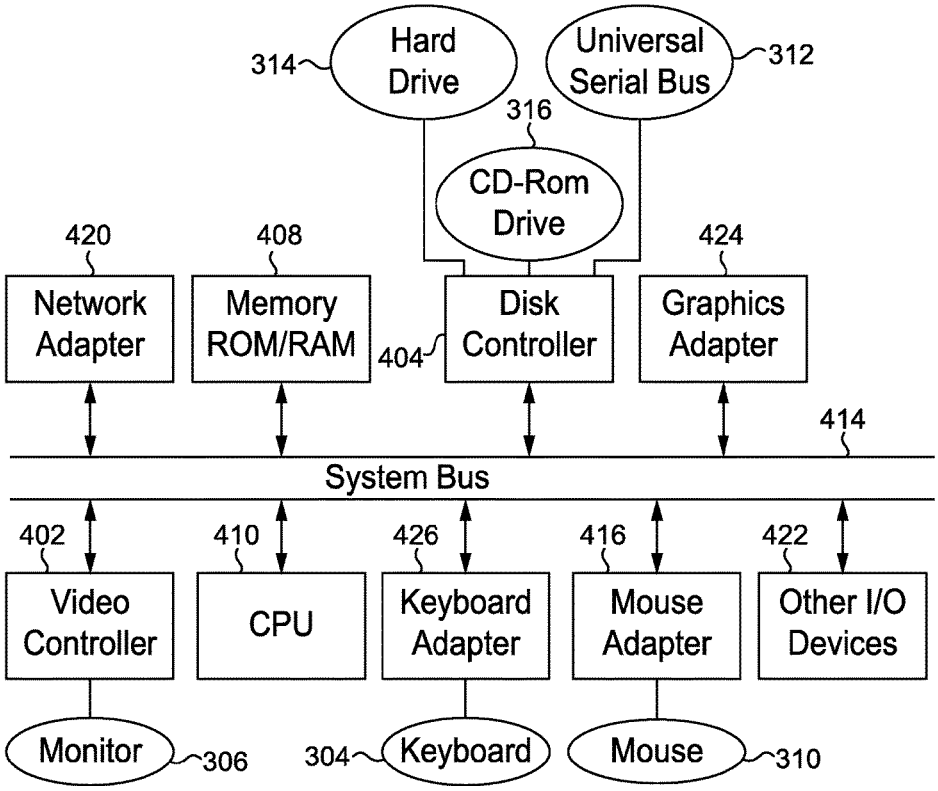
FIG. 6 illustrates a representative block diagram of exemplary elements included on the circuit boards inside a chassis of the computer system of FIG. 5.

FIG. 5 illustrates an exemplary embodiment of a computer system 300, all of which or a portion of which can be suitable for (i) implementing part or all of one or more embodiments of the techniques, methods, and systems and/or (ii) implementing and/or operating part or all of one or more embodiments of mobile fueling system 100 (FIGS. 1A, 1B, 2A, 2B) described herein. As an example, a different or separate one of a chassis 302 (and its internal components) can be suitable for implementing part or all of one or more embodiments of the techniques, methods, and/or systems described herein. Furthermore, one or more elements of computer system 300 (e.g., a refreshing monitor 306, a keyboard 304, and/or a mouse 310, etc.) can also be appropriate for implementing part or all of one or more embodiments of the techniques, methods, and/or systems described herein. Computer system 300 can comprise chassis 302 containing one or more circuit boards (not shown), a Universal Serial Bus (USB) port 312, a Compact Disc Read-Only Memory (CD-ROM), Digital Video Disc (DVD) drive, and/or Blu-ray drive 316, and a hard drive 314. A representative block diagram of the elements included on the circuit boards inside chassis 302 is shown in FIG. 6. A central processing unit (CPU) 310 in FIG. 6 is coupled to a system bus 314 in FIG. 5. In various embodiments, the architecture of CPU 310 can be compliant with any of a variety of commercially distributed architecture families. While the computer system 300 is depicted in FIG. 5 in the form of a personal computer, the computer system 300 can also be in a form embodied in mobile fueling system 100 (FIGS. 1A, 1B, 2A, 2B) and/or a vehicle 101 (FIGS. 2A, 2B) and/or other mobile device having mobile fueling system 100 (FIGS. 1A, 1B, 2A, 2B).

Continuing with FIG. 6, system bus 314 also is coupled to a memory storage unit 308, where memory storage unit 308 can comprise (i) non-volatile (e.g., non-transitory) memory, such as, for example, read only memory (ROM) and/or (ii) volatile (e.g., transitory) memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage device(s) of the various embodiments disclosed herein can comprise memory storage unit 308, an external memory storage drive (not shown), such as, for example, a USB-equipped electronic memory storage drive coupled to universal serial bus (USB) port 312 (FIGS. 5 & 6), hard drive 314 (FIGS. 5 & 6), CD-ROM and/or DVD drive 316 (FIGS. 5 & 6), a floppy disk drive (not shown), an optical disc (not shown), a magneto-optical disc (now shown), magnetic tape (not shown), etc. Further, non-volatile or non-transitory memory storage device(s) refer to the portions of the memory storage device(s) that are non-volatile (e.g., non-transitory) memory.

In various examples, portions of the memory storage device(s) of the various embodiments disclosed herein (e.g., portions of the non-volatile memory storage device(s)) can be encoded with a boot code sequence suitable for restoring computer system 300 (FIG. 5) to a functional state after a system reset. In addition, portions of the memory storage device(s) of the various embodiments disclosed herein (e.g., portions of the non-volatile memory storage device(s)) can comprise microcode such as a Basic Input-Output System (BIOS) or Unified Extensible Firmware Interface (UEFI) operable with computer system 300 (FIG. 5). In the same or different examples, portions of the memory storage device (s) of the various embodiments disclosed herein (e.g., portions of the non-volatile memory storage device(s)) can comprise an operating system, which can be a software program that manages the hardware and software resources of a computer and/or a computer network. Meanwhile, the operating system can perform basic tasks such as, for example, controlling and allocating memory, prioritizing the processing of instructions, controlling input and output devices, facilitating networking, and managing files. Exemplary operating systems can comprise (i) Microsoft® Windows® operating system (OS) by Microsoft Corp. of Redmond, Wash., United States of America, (ii) Mac® OS by Apple Inc. of Cupertino, Calif., United States of America, (iii) UNIX® OS, and (iv) Linux® OS. Further exemplary operating systems can comprise (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States of America, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

As used herein, "processor" and/or "processing device" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing devices of the various embodiments disclosed herein can comprise CPU 410.

In the depicted embodiment of FIG. 6, various I/O devices such as a disk controller 404, a graphics adapter 424, a video controller 402, a keyboard adapter 426, a mouse adapter 406, a network adapter 420, and other I/O devices 422 can be coupled to system bus 414. Keyboard adapter 426 and mouse adapter 406, if provided, can be are coupled to keyboard 304 (FIGS. 5 & 6) and mouse 310 (FIGS. 5 & 6), respectively, of computer system 300 (FIG. 5). While graphics adapter 424 and video controller 402 are indicated as distinct units in FIG. 6, video controller 402 can also be integrated into graphics adapter 424, or vice versa in other embodiments. Video controller 402 is suitable for refreshing monitor 306 (FIGS. 5 & 6) to display images on a screen 308 (FIG. 5) of computer system 300 (FIG. 5). Disk controller 404 can control hard drive 314 (FIGS. 5 & 6), USB port 312 (FIGS. 5 & 6), and CD-ROM drive 316 (FIGS. 5 & 6). In other embodiments, distinct units can be used to control each of these devices separately.

Network adapter 420 can be suitable to connect computer system 300 (FIG. 5) to a computer network by wired communication (e.g., a wired network adapter) and/or wireless communication (e.g., a wireless network adapter). In some embodiments, network adapter 420 can be plugged or coupled to an expansion port (not shown) in computer system 400 (FIG. 5). In other embodiments, network adapter 420 can be built into computer system 300 (FIG. 5). For example, network adapter 420 can be built into computer system 300 (FIG. 1) by being integrated into the motherboard chipset (not shown), or implemented via one or more dedicated communication chips (not shown), connected through a PCI (peripheral component interconnector) or a PCI express bus of computer system 300 (FIG. 5) or USB port 312 (FIG. 5).

Returning now to FIG. 5, although many other components of computer system 300 are not shown, such components and their interconnection are well known to those of ordinary skill in the art. Accordingly, further details concerning the construction and composition of computer system 300 and the circuit boards inside chassis 302 are not discussed herein.

Meanwhile, when computer system 300 is running, program instructions (e.g., computer instructions) stored on one or more of the memory storage device(s) of the various embodiments disclosed herein can be executed by CPU 410 (FIG. 6). At least a portion of the program instructions, stored on these devices, can be suitable for carrying out at least part of the techniques and methods described herein. In various embodiments, computer 300 can be reprogrammed with one or more systems, applications, and/or databases to convert computer system 300 from a general purpose computer to a special purpose computer.

Further, although computer system 300 is illustrated as a desktop computer in FIG. 5, in many examples, system 300 can have a different form factor while still having functional elements similar to those described for computer system 300, such as a computer system 300 embodied in a vehicle or other mobile device. In some embodiments, computer system 300 can comprise a single computer, a single server, or a cluster or collection of computers or servers, or a cloud of computers or servers. Typically, a cluster or collection of servers can be used when the demand on computer system 300 exceeds the reasonable capability of a single server or computer. In certain embodiments, computer system 300 can comprise a portable computer, such as a laptop computer. In certain other embodiments, computer system 300 can comprise a mobile device, such as a smart phone. In certain additional embodiments, computer system 300 can comprise an embedded system.

Although the invention has been described with reference to specific embodiments, it will be understood by those skilled in the art that various changes can be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-7 can be modified, and that the foregoing discussion of certain of these embodiments does not necessarily represent a complete description of all possible embodiments. For example, one or more of the activities of the methods depicted in FIGS. 3-4, or one or more of the other methods described herein can include different activities and be performed by many different elements, in many different orders. As another example, the elements within the computer system 300 and/or user computer in FIGS. 5 and 6 can be interchanged or otherwise modified.

Generally, replacement of one or more claimed elements constitutes reconstruction and not repair. Additionally, benefits, other advantages, and solutions to problems have been described with regard to specific embodiments. The benefits, advantages, solutions to problems, and any element or elements that can cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A method comprising:

detecting one or more of opening or closing of a lid for a recessed compartment; and

[initiating a flow of gas into the recessed compartment, or] changing a flow rate of [the] gas into the recessed compartment, (*a*) upon or after detecting the opening or closing of the lid, and (*b*) before, during or after dispensing fuel from [or] *and* delivering the fuel [to] *through the recessed compartment and into* a mobile fuel storage tank, wherein detecting *the* one or more of *the* opening or closing of the lid comprises:

detecting a motion of the lid from an open state towards a closed state, or from the closed state towards the open state.

2. The method according to claim 1, wherein:

[initiating the flow of the gas into the recessed compartment, or] changing the flow rate of the gas[, upon or after detecting the opening or closing of the lid] comprises:

initiating [the] *a* flow of the gas into the recessed compartment upon or after detecting the opening or closing of the lid.

3. The method according to claim 1, wherein:

[initiating the flow of the gas into the recessed compartment, or] changing the flow rate of the gas[, upon or after detecting the opening or closing of the lid] comprises:

increasing the flow rate of the gas into the recessed compartment upon or after detecting the opening or closing of the lid.

4. The method according to claim 1, wherein:

[initiating the flow of the gas into the recessed compartment, or] changing the flow rate of the gas[, upon or after detecting the opening or closing of the lid] comprises:

changing the flow rate of the gas after a predetermined period of time has elapsed following detecting the opening or closing of the lid.

5. The method according to claim 1, wherein:

[initiating the flow of the gas into the recessed compartment, or] changing the flow rate of the gas[, upon or after detecting the opening or closing of the lid] comprises:

reducing the flow rate of the gas into the recessed compartment in relation to detecting the opening or closing of the lid.

6. The method according to claim 1, wherein:

[initiating the flow of the gas into the recessed compartment, or] changing the flow rate of the gas[, upon or after detecting the opening or closing of the lid] comprises:

ceasing the flow rate of the gas into the recessed compartment upon or after detecting the opening or closing of the lid.

7. The method according to claim 1, wherein:

[initiating the flow of the gas into the recessed compartment, or] changing the flow rate of the gas[, upon or after detecting the opening or closing of the lid] comprises:

increasing the flow rate of the gas into the recessed compartment upon or after detecting the opening of the lid; and decreasing the flow rate of the gas into the recessed compartment upon or after detecting the closing of the lid.

8. The method according to claim 7, wherein:

[initiating the flow of the gas into the recessed compartment, or] changing the flow rate of the gas [before, during or after dispensing fuel from or delivering the fuel to a mobile fuel storage tank] comprises:

increasing the flow rate of the gas into the recessed compartment before dispensing the fuel from [or] *and* delivering the fuel to the mobile fuel storage tank, *through the recessed compartment*; and decreasing the flow rate of the gas into the recessed compartment after dispensing the fuel from [or] *and* delivering the fuel to the mobile fuel storage tank, *through the recessed compartment*.

9. The method according to claim 1, wherein:

[initiating the flow of the gas into the recessed compartment, or] changing the flow rate of the gas [before, during or after dispensing fuel from or delivering the fuel to a mobile fuel storage tank] comprises:

increasing the flow rate of the gas into the recessed compartment before dispensing the fuel from [or] *and* delivering the fuel to the mobile fuel storage tank, *through the recessed compartment*; and decreasing the flow rate of the gas into the recessed compartment after dispensing the fuel from [or] *and* delivering the fuel to the mobile fuel storage tank, *through the recessed compartment*.

10. The method according to claim 1, wherein:

[initiating the flow of the gas into the recessed compartment, or] changing the flow rate of the gas [before, during or after dispensing fuel from or delivering the fuel to a mobile fuel storage tank] comprises:

increasing or decreasing the flow rate of the gas into the recessed compartment for a predetermined period of time.

11. The method according to claim 1, wherein:

[initiating the flow of the gas into the recessed compartment, or] changing the flow rate of the gas comprises:

increasing or decreasing the flow rate of the gas into the recessed compartment to obtain a predetermined pressure of the gas in the recessed compartment.

12. The method according to claim 1, wherein:

[initiating the flow of the gas into the recessed compartment, or] changing the flow rate of the gas comprises:

increasing the flow rate of the gas into the recessed compartment to change a pressure of the gas in the recessed compartment from a first pressure to a second pressure that is greater than the first pressure.

13. The method according to claim 1, wherein:

[initiating the flow of the gas into the recessed compartment, or] changing the flow rate of the gas comprises:

decreasing the flow rate of the gas into the recessed compartment to change a pressure of the gas in the recessed compartment from a first pressure to a second pressure that is less than the first pressure.

14. The method of claim 1, wherein:

[initiating the flow of the gas into the recessed compartment, or] changing the flow rate of the gas[, upon or after detecting the opening or closing of the lid] comprises:

increasing or decreasing the flow rate of the gas into the recessed compartment to obtain a predetermined pressure of the gas in the recessed compartment after a predetermined period of time has elapsed following detecting the opening or closing of the lid.

15. The method of claim 1, wherein:

[initiating the flow of the gas into the recessed compartment, or] changing the flow rate of the gas comprises:

increasing or decreasing the flow rate of the gas into the recessed compartment for a predetermined period of time to increase or decrease, respectively, a pressure of the gas in the recessed compartment.

16. The method of claim 1, wherein:

[initiating the flow of the gas into the recessed compartment, or] changing the flow rate of the gas [before, during or after dispensing fuel from or delivering the fuel to a mobile fuel storage tank] comprises:

increasing the flow rate of the gas into the recessed compartment to increase [the] *a* pressure of the gas in the recessed compartment before dispensing the fuel from [or] *and* delivering the fuel to the mobile fuel storage tank, *through the recessed compartment*; and decreasing the flow rate of the gas into the recessed compartment to decrease the pressure of the gas in the recessed compartment after dispensing the fuel from [or] *and* delivering the fuel to the mobile fuel storage tank, *through the recessed compartment*.

17. The method of claim 1, wherein:

[initiating the flow of the gas into the recessed compartment, or] changing the flow rate of the gas [before, during or after dispensing fuel from or delivering the fuel to a mobile fuel storage tank] comprises:

decreasing the flow rate of the gas into the recessed compartment to decrease [the] *a* pressure of the gas in the recessed compartment before dispensing the fuel from [or] *and* delivering the fuel to the mobile fuel storage tank, *through the recessed compartment*; and increasing the flow rate of the gas into the recessed compartment to increase the pressure of the gas in the recessed compartment after dispensing the fuel from [or] *and* delivering the fuel to the mobile fuel storage tank, *through the recessed compartment*.

18. The method of claim 1, wherein:

[initiating the flow of the gas into the recessed compartment, or] changing the flow rate of the gas [before, during or after dispensing fuel from or delivering the fuel to a mobile fuel storage tank] comprises:

increasing or decreasing the flow rate of the gas into the recessed compartment to increase or decrease, respectively, [the] *a* pressure of the gas in the recessed compartment before dispensing the fuel from [or] *and* delivering the fuel to the mobile fuel storage tank, *through the recessed compartment*; and increasing or decreasing the flow rate of the gas into the recessed compartment to provide a predetermined pressure of the gas in the recessed compartment after dispensing *the* fuel from [or] *and* delivering the fuel to the mobile fuel storage tank, *through the recessed compartment*.

* * * * *